(12) United States Patent
Wang et al.

(10) Patent No.: US 12,477,598 B2
(45) Date of Patent: Nov. 18, 2025

(54) HOTSPOT COMMUNICATION STABILIZATION SYSTEM

(71) Applicants: Yao Ching Wang, Taipei (TW); Yi Chieh Chen, Taipei (TW); Yu Ning Lan, Taipei (TW)

(72) Inventors: Yao Ching Wang, Taipei (TW); Yi Chieh Chen, Taipei (TW); Yu Ning Lan, Taipei (TW)

( * ) Notice: Subject to any disclaimer, the term of this patent is extended or adjusted under 35 U.S.C. 154(b) by 308 days.

(21) Appl. No.: 18/376,845

(22) Filed: Oct. 5, 2023

(65) Prior Publication Data

US 2025/0119960 A1 Apr. 10, 2025

(51) Int. Cl.
*H04W 76/11* (2018.01)
*H04W 24/02* (2009.01)

(52) U.S. Cl.
CPC ............ *H04W 76/11* (2018.02); *H04W 24/02* (2013.01)

(58) Field of Classification Search
CPC .............................. H04W 76/11; H04W 24/02
See application file for complete search history.

(56) References Cited

U.S. PATENT DOCUMENTS

| | | | |
|---|---|---|---|
| 10,952,145 B2* | 3/2021 | Kweon | H04W 4/80 |
| 2011/0013569 A1* | 1/2011 | Scherzer | H04W 48/20 |
| | | | 707/769 |
| 2012/0014316 A1* | 1/2012 | Rahman | H04B 3/54 |
| | | | 370/328 |
| 2012/0204243 A1* | 8/2012 | Wynn | H04L 63/1433 |
| | | | 726/5 |
| 2015/0055506 A1* | 2/2015 | Birlik | H04W 72/27 |
| | | | 370/254 |
| 2022/0191950 A1* | 6/2022 | Ergen | H04W 24/02 |

\* cited by examiner

*Primary Examiner* — David Bilodeau

(57) ABSTRACT

A hotspot communication stabilization system includes a hotspot communication stabilizer. The hotspot communication stabilizer includes a connected device address search unit and a comparator. The connected device address search unit serves to obtain at least one connection address from a communication host device at regular or irregular intervals. The connection address is an address of a peripheral communication device connected to the communication host device and is stored in a connection address table. The comparator serves to determine whether there is a missing address in the connection address table at a current time by comparing two connection addresses of the peripheral communication device at two adjacent times. The missing address is sent to the communication host device and the communication host device re-establishes a hotspot signal connection to the missing address corresponded to a corresponding peripheral communication device.

7 Claims, 3 Drawing Sheets

HOTSPOT COMMUNICATION STABILIZATION SYSTEM

FIELD OF INVENTION

The present invention is related to hotspot communication, and in particular to a hotspot communication stabilization system.

BACKGROUND OF INVENTION

Nowadays, many wireless or wired communication devices can become communication hosts by turning on the hotspot communication, which makes other peripheral communication devices share its communication function. For example, a mobile phone has 5G communication capabilities, while a tablet PC is often not equipped with a long distance communication module and it cannot directly perform long distance communication. Therefore, it is possible to share the 5G communication function of the mobile phone by connecting to the mobile phone with a short-range communication. The communication device is for example a mobile phone, a tablet or a computer with hotspot communication. The short-range communication may be Bluetooth, Wi-Fi, NFC and other kinds of short-range communication.

However, the disadvantage of the hotspot communication is that the connection between the communication host device and the connected communication device is very fragile and can be easily interrupted for many reasons. These reasons include the interfering of the communication signal or no signal interaction for a long period of time, which cause that the communication host device thinks that the hotspot communication is closed and then automatically closes the hotspot signal connection. As a result, a user must manually re-establish the hotspot signal connection, which is quite inconvenient.

SUMMARY OF THE INVENTION

Accordingly, the object of the present invention is to provide a hotspot communication stabilization system, wherein advantages of the present invention is that a hotspot communication stabilizer is used to connect to a communication host device and verify the addresses of the peripheral communication devices connected to the communication host device for notifying the communication host device to verify whether the hotspot signal connection is unreasonably interrupted, so as to re-establish the unreasonably interrupted hotspot signal connection at any time. Therefore, a stable and robust hotspot signal connection can be keep without the inconvenience of users having to re-establish the connection due to a broken hotspot signal connection. Moreover, the hotspot communication stabilizer can be connected to multiple communication hosts at the same time to achieve the convenience and economy by only one hotspot communication stabilizer.

To achieve above object, the present invention provides a hotspot communication stabilization system comprising: a hotspot communication stabilizer; the hotspot communication stabilizer positioned near at least one communication host device which is capable of performing a hotspot communication; each of the at least one communication host device being capable of being connected to at least one peripheral communication device through a specific communication; and wherein when each of the at least one communication host device turns on the hotspot communication, each of the at least one peripheral communication device is capable of connecting to a corresponding communication host device with a permission of the corresponding communication host device and connecting to an external network through the corresponding communication host device; the hotspot communication stabilizer including: a transceiver serving to receive hotspot signals from the at least one communication host device for establishing at least one hotspot signal connection between the hotspot communication stabilizer and the at least one communication host device respectively; a processor connected to the transceiver; the processer serving to receive the hotspot signals of the at least one communication host device through the transceiver and to process the hotspot signals; the processer including: a connected device address search unit serving to obtain at least one connection address stored in each of the at least one communication host device respectively; each of the at least one connection address being an address of a respective peripheral communication device connected to a corresponding communication host device; each of the at least one communication host device performing at least one respective hotspot signal connection to the at least one respective peripheral communication device by using the at least one connection address respectively; the connected device address search unit including at least one connection address table; each of the at least one connection address table being corresponded to a respective communication host device; and the at least one address obtained from the respective communication host device being stored in a respective connection address table; the hotspot communication stabilizer being capable of downloading the at least one connection address of the at least one peripheral communication device connected to a respective communication host device from each of the at least one communication host device at regular or irregular intervals; and a download time of each downloading and all connection addresses corresponded to the download time being stored in the respective connection address table; a comparator connected to the at least one connection address table; wherein for each of the at least one connection address table, the comparator serves to determine whether there is at least one missing address in a corresponding connection address table at a current time by comparing two connection addresses of each of the at least one peripheral communication device at two adjacent download times in the corresponding connection address table; a reminder device connected to the comparator and the transceiver; each of the at least one communication host device including a hotspot connection table; wherein when the comparator obtains the at least one missing address from a corresponding connection address table, the at least one missing address is sent by the reminder device to the hotspot connection table of a corresponding communication host device; the corresponding communication host device performs the hotspot signal connection to each of the at least one missing address corresponded to a corresponding peripheral communication device when connecting to the at least one corresponding peripheral communication device according to the hotspot connection table; and when the peripheral communication device corresponded to a respective missing address is in a state of waiting the hotspot signal connection, the hotspot signal connection is re-established with the respective missing address by the corresponding communication host device; and wherein each of the at least one communication host device is capable of checking whether each of the at least one missing address obtained from a respective connection address table of the hotspot communication stabilizer is a legally disconnected connection address before connecting to each of the at least one corresponding peripheral communication device; and each of the at least one communication host device does not connect to the missing address which is a legally disconnected connection address of a respective peripheral communication device.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
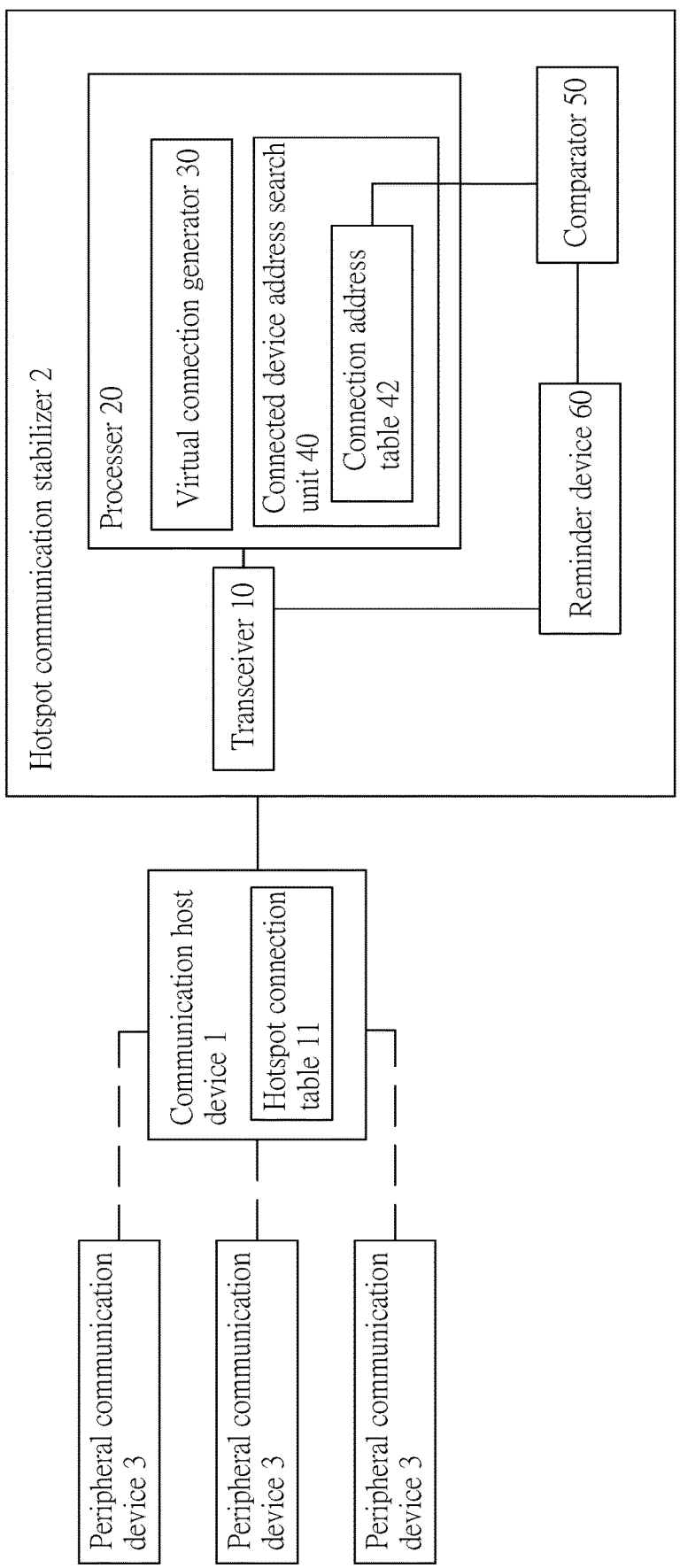
FIG. 1 is a structure block diagram of the elements of the present invention.
Figure 2:
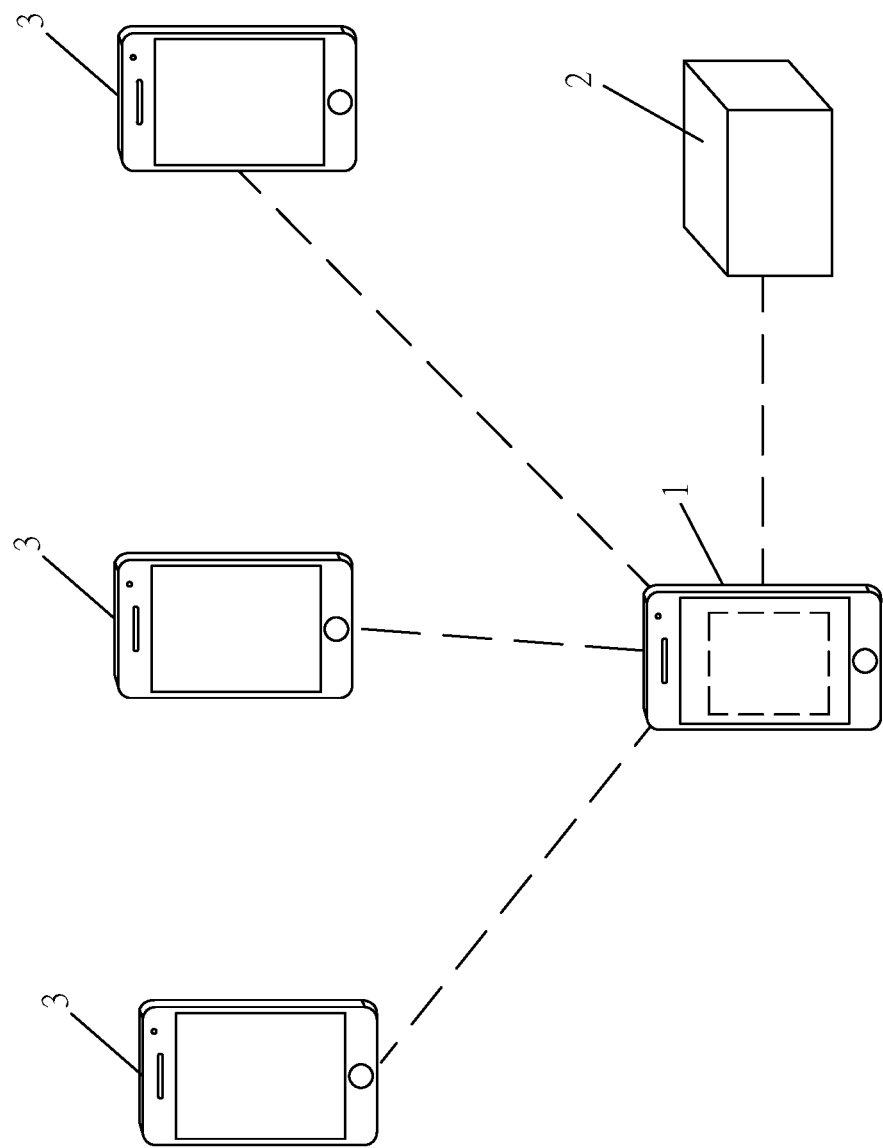
FIG. 2 shows an application of the present invention, wherein the hotspot communication stabilizer is connected to one communication host device.
Figure 3:
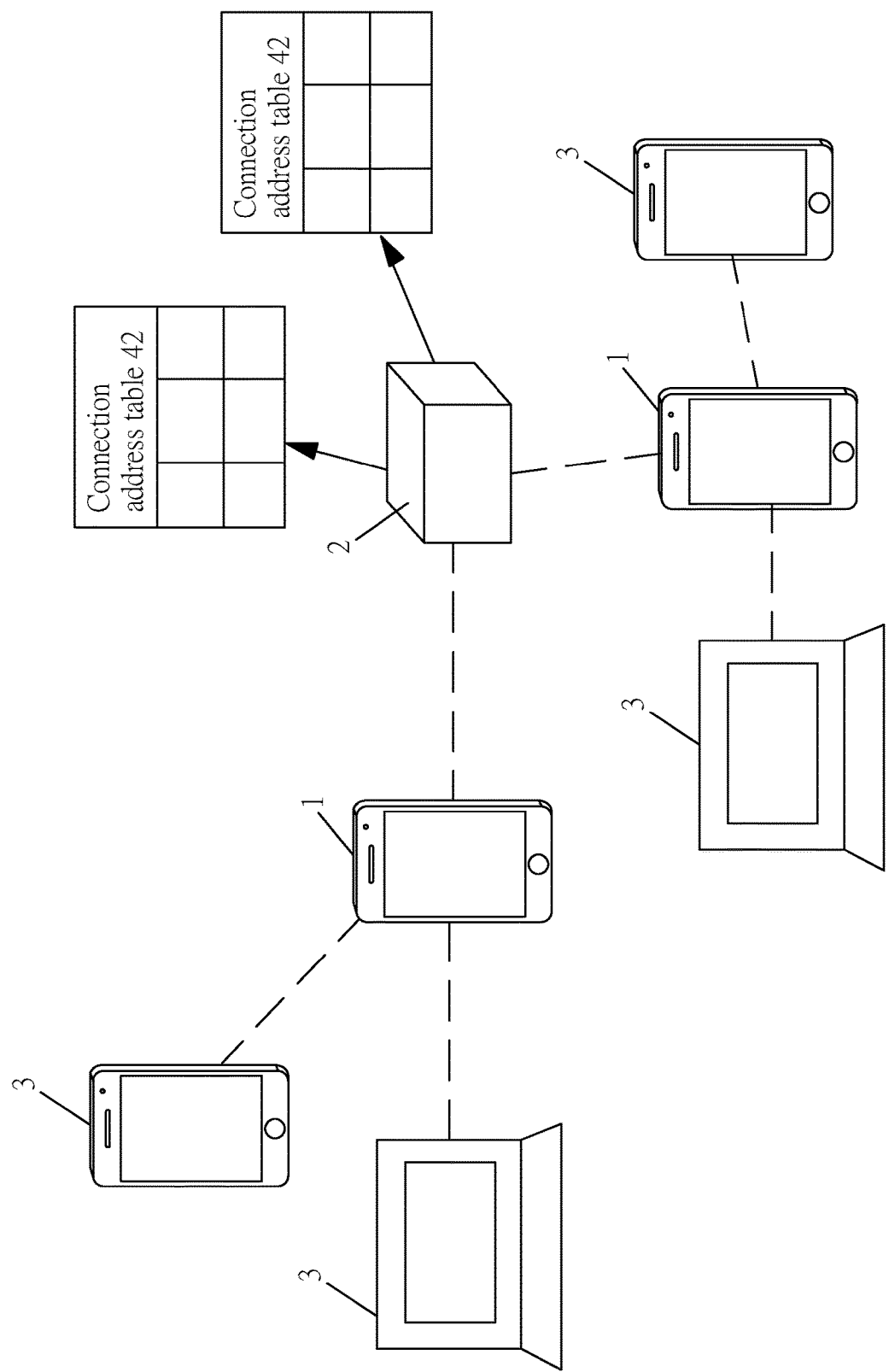
FIG. 3 shows another application of the present invention, wherein the stabilizer is connected to a plurality of hotspot communication communication host devices.

With reference to FIGS. 1 to 3, the structure of the hotspot communication stabilization system of the present invention is illustrated. The hotspot communication stabilization system comprises following elements.

A hotspot communication stabilizer 2 is positioned near at least one communication host device 1 which is capable of performing a hotspot communication. Each of the at least one communication host device 1 is capable of being connected to at least one peripheral communication device 3 through a specific communication. FIG. 2 shows an application of the present invention, wherein there is one communication host device 1 connecting to three peripheral communication devices 3. The peripheral communication device 3 is selected from a mobile phone, a tablet or a computer capable of performing a hotspot communication. The specific communication is performed by a short-range communication, such as Bluetooth, Wi-Fi or NFC or other kinds of short-range communication.

When each of the at least one communication host device 1 turns on the hotspot communication, each of the at least one peripheral communication device 3 is capable of connecting to a corresponding communication host device 1 with a permission of the corresponding communication host device 1 (through a password checking) and connecting to an external network through the corresponding communication host device 1.

In the present invention, the hotspot communication stabilizer 2 includes following elements.

A transceiver 10 serves to receive hotspot signals from the at least one communication host device 1 for establishing at least one hotspot signal connection between the hotspot communication stabilizer 2 and the at least one communication host device 1 respectively. The transceiver 10 may be a wired transceiver or a wireless transceiver.

A processer 20 is connected to the transceiver 10. The processer 20 serves to receive the hotspot signals of the at least one communication host device 1 through the transceiver 10 and to process the hotspot signals.

The processer 20 includes:

A virtual connection generator 30 serves to create at least one virtual connection to each of the at least one communication host device 1 respectively. Each of the at least one virtual connection is created by sending a connection signal to a respective communication host device 1. Each of the at least one virtual connection is created by sending a connection signal for perform a respective hotspot signal connection to a respective communication host device 1 at a plurality of predetermined times to keep the respective hotspot signal connection between the respective communication host device 1 and the hotspot communication stabilizer 2. The virtual connection generator 30 sends the connection signal to the respective communication host device 1 for connecting a website in an external network (such as WWW (World Wide Web)) through the respective communication host device, which causes that the hotspot signal connection between each of the at least one communication host device 1 and the hotspot communication stabilizer 2 is persisted to avoid that the hotspot communication is automatically closed by a respective communication host device 1 when there is no hotspot signal connection to the respective communication host device 1.

For example, the virtual connection generator 30 sends a connection signal for connecting the website of Facebook to a respective communication host device 1 to create the virtual connection to the communication host device 1 so that the hotspot communication stabilizer 2 is capable of connecting to the website of Facebook. By this virtual connection, the respective communication host device 1 keeps the hotspot signal connection to the hotspot communication stabilizer 2.

The virtual connection generator 30 is capable of sending the connection signal at a plurality of predetermined times to each of the at least one communication host device 1 for keeping the at least one hotspot signal connection between the at least one communication host device 1 and the hotspot communication stabilizer 2.

A connected device address search unit 40 serves to obtain at least one connection address stored in each of the at least one communication host device 1 respectively. Each of the at least one connection address is an address of a respective peripheral communication device 3 connected to a corresponding communication host device 1. Each of the at least one communication host device 1 performs at least one respective hotspot signal connection to the at least one respective peripheral communication device 3 by using the at least one connection address respectively. The connected device address search unit 40 includes at least one connection address table 42. Each of the at least one connection address table 42 is corresponded to a respective communication host device 1. The at least one address obtained from the respective communication host device 1 is stored in a respective connection address table 42.

The hotspot communication stabilizer 2 is capable of downloading the at least one connection address of the at least one peripheral communication device 3 connected to a respective communication host device 1 from each of the at least one communication host device 1 at regular or irregular intervals. A download time of each downloading and all connection addresses corresponded to the download time are stored in the respective connection address table 42.

A comparator 50 is connected to the at least one connection address table 42. For each of the at least one connection address table 42, the comparator 50 serves to determine whether there is at least one missing address in a corresponding connection address table 42 at a current time by comparing two connection addresses of each of the at least one peripheral communication device 3 at two adjacent download times in the corresponding connection address table 42. When the connection address of a respective peripheral communication device 3 exists in the connection addresses corresponded to a previous download time and does not exist in the connection addresses corresponded to a next download time, the connection address is viewed as one missing address.

A reminder device 60 is connected to the comparator 50 and the transceiver 10. Each of the at least one communication host device 1 includes a hotspot connection table 11. When the comparator 50 obtains the at least one missing address from a corresponding connection address table 42, the at least one missing address is sent by the reminder device 60 to the hotspot connection table 11 of a corresponding communication host device 1. The corresponding communication host device 1 performs the hotspot signal connection to each of the at least one missing address corresponded to a corresponding peripheral communication device 3 when connecting to the at least one corresponding peripheral communication device 3 according to the hotspot connection table 11. When the peripheral communication device 3 corresponded to a respective missing address is in a state of waiting the hotspot signal connection, the hotspot signal connection is re-established with the respective missing address by the corresponding communication host device 1.

When a number of the at least one peripheral communication device 3 corresponded to a corresponding connection address table 42 compared by the comparator 50 for a consecutive predetermined number of times is zero, the hotspot communication stabilizer 2 closes the virtual connection created by the virtual connection generator 30 for the corresponding communication host device 1 to cause that the corresponding communication host device 1 determines whether to keep the hotspot signal connection by itself.

Each of the at least one communication host device 1 is capable of checking whether each of the at least one missing address obtained from a respective connection address table 42 of the hotspot communication stabilizer 2 is a legally disconnected connection address before connecting to each of the at least one corresponding peripheral communication device 3. Each of the at least one communication host device 1 does not connect to the missing address which is a legally disconnected connection address of a respective peripheral communication device 3.

By using above structure, the hotspot signal connections can be persisted between the at least one communication host device 1 and all connected peripheral communication device 3 for a long time, which will not cause the hotspot signal connection to be interrupted due to various reasons in the prior arts and also will not cause the inconvenience because a user has to repeatedly establish the hotspot signal connection.

FIG. 3 shows another application of the present invention. The at least one communication host devices 1 is a plurality of communication host devices 1. The hotspot communication stabilizer 2 is connected to the communication host devices 1 and processes the hotspot signals of each of the communication host devices 1 simultaneously by using comparator 50 and the reminder device 60 to keep the hotspot signal connections to the communication host devices 1 respectively without any abnormal hotspot signal connection interruption. The at least one connection address table 42 of the hotspot communication stabilizer 2 is a plurality of connection address tables 42 and each of the connection address tables 42 is corresponded to a respective communication host device 1. The hotspot communication stabilizer 2 compares the connection addresses of each of the communication host devices 1 according to each of the connection address tables 42 to determine if there is at least one corresponding missing address in each of the connection address tables 42. When the hotspot communication stabilizer 2 obtains the at least one corresponding missing address, the hotspot communication stabilizer 2 notifies the respective communication host device 1 for checking if there is a need to re-establish the hotspot signal connection to the at least one corresponding missing address.

Referring to FIG. 3, the hotspot communication stabilizer 2 is connected to two communication host devices 1 and has two connection address tables 42 for the two communication host devices 1 respectively to control the hotspot signal connection of each of the two communication host devices 1.

Advantages of the present invention is that a hotspot communication stabilizer is used to connect to a communication host device and verify the addresses of the peripheral communication devices connected to the communication host device for notifying the communication host device to verify whether the hotspot signal connection is unreasonably interrupted, so as to re-establish the unreasonably interrupted hotspot signal connection at any time. Therefore, a stable and robust hotspot signal connection can be keep without the inconvenience of users having to re-establish the connection due to a broken hotspot signal connection. Moreover, the hotspot communication stabilizer can be connected to multiple communication hosts at the same time to achieve the convenience and economy by only one hotspot communication stabilizer.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hotspot communication stabilization system comprising:
a hotspot communication stabilizer; the hotspot communication stabilizer positioned near at least one communication host device which is capable of performing a hotspot communication; each of the at least one communication host device being capable of being connected to at least one peripheral communication device through a specific communication; and wherein when each of the at least one communication host device turns on the hotspot communication, each of the at least one peripheral communication device is capable of connecting to a corresponding communication host device with a permission of the corresponding communication host device and connecting to an external network through the corresponding communication host device;

the hotspot communication stabilizer including:

a transceiver serving to receive hotspot signals from the at least one communication host device for establishing at least one hotspot signal connection between the hotspot communication stabilizer and the at least one communication host device respectively;

a processor connected to the transceiver; the processor serving to receive the hotspot signals of the at least one communication host device through the transceiver and to process the hotspot signals;

the processor including:

a connected device address search unit serving to obtain at least one connection address stored in each of the at least one communication host device respectively; each of the at least one connection address being an address of a respective peripheral communication device connected to a corresponding communication host device; each of the at least one communication host device performing at least one respective hotspot signal connection to the at least one respective peripheral communication device by using the at least one connection address respectively; the connected device address search unit including at least one connection address table; each of the at least one connection address table being corresponded to a respective communication host device; and the at least one address obtained from the respective communication host device being stored in a respective connection address table;

the hotspot communication stabilizer being capable of downloading the at least one connection address of the at least one peripheral communication device connected to a respective communication host device from each of the at least one communication host device at regular or irregular intervals; and a download time of each downloading and all connection addresses corresponded to the download time being stored in the respective connection address table;

a comparator connected to the at least one connection address table; wherein for each of the at least one connection address table, the comparator serves to determine whether there is at least one missing address in a corresponding connection address table at a current time by comparing two connection addresses of each of the at least one peripheral communication device at two adjacent download times in the corresponding connection address table;

a reminder device connected to the comparator and the transceiver; each of the at least one communication host device including a hotspot connection table; wherein when the comparator obtains the at least one missing address from a corresponding connection address table, the at least one missing address is sent by the reminder device to the hotspot connection table of a corresponding communication host device; the corresponding communication host device performs the hotspot signal connection to each of the at least one missing address corresponded to a corresponding peripheral communication device when connecting to the at least one corresponding peripheral communication device according to the hotspot connection table; and when the peripheral communication device corresponded to a respective missing address is in a state of waiting the hotspot signal connection, the hotspot signal connection is re-established with the respective missing address by the corresponding communication host device; and wherein each of the at least one communication host device is capable of checking whether each of the at least one missing address obtained from a respective connection address table of the hotspot communication stabilizer is a legally disconnected connection address before connecting to each of the at least one corresponding peripheral communication device; and each of the at least one communication host device does not connect to the missing address which is a legally disconnected connection address of a respective peripheral communication device.

2. The hotspot communication stabilization system as claimed in claim 1, wherein the at least one communication host devices is a plurality of communication host devices; the hotspot communication stabilizer is connected to the communication host devices and processes the hotspot signals of each of the communication host devices simultaneously by using comparator and the reminder device to keep the hotspot signal connections to the communication host devices respectively without any abnormal hotspot signal connection interruption; the at least one connection address table of the hotspot communication stabilizer is a plurality of connection address tables and each of the connection address tables is corresponded to a respective communication host device; the hotspot communication stabilizer compares the connection addresses of each of the communication host devices according to each of the connection address tables to determine if there is at least one corresponding missing address in each of the connection address tables; and when the hotspot communication stabilizer obtains the at least one corresponding missing address, the hotspot communication stabilizer notifies the respective communication host device for checking if there is a need to re-establish the hotspot signal connection to the at least one corresponding missing address.

3. The hotspot communication stabilization system as claimed in claim 1, wherein the peripheral communication device is selected from a mobile phone, a tablet or a computer capable of performing the hotspot communication; the specific communication is performed by Bluetooth, Wi-Fi or NFC.

4. The hotspot communication stabilization system as claimed in claim 1, wherein the transceiver is a wired transceiver or a wireless transceiver.

5. The hotspot communication stabilization system as claimed in claim 1, wherein the processor further includes a virtual connection generator serving to create at least one virtual connection to each of the at least one communication host device respectively; wherein each of the at least one virtual connection is created by sending a connection signal for perform a respective hotspot signal connection to a respective communication host device at a plurality of predetermined times to keep the respective hotspot signal connection between the respective communication host device and the hotspot communication stabilizer.

6. The hotspot communication stabilization system as claimed in claim 5, wherein the virtual connection generator sends the connection signal to the respective communication host device for connecting a website in an external network through the respective communication host device, which causes that the hotspot signal connection between each of the at least one communication host device and the hotspot communication stabilizer is persisted to avoid that the hotspot communication is automatically closed by a respective communication host device when there is no hotspot signal connection to the respective communication host device.

7. The hotspot communication stabilization system as claimed in claim 5, wherein when a number of the at least one peripheral communication device corresponded to a corresponding connection address table compared by the comparator for a consecutive predetermined number of times is zero, the hotspot communication stabilizer closes the virtual connection created by the virtual connection generator for the corresponding communication host device to cause that the corresponding communication host device determines whether to keep the hotspot signal connection by itself.

\* \* \* \* \*